United States Patent
Hager et al.

[11] 3,759,981
[45] Sept. 18, 1973

[54] ESTERS OF PERFLUOROALKYL TERMINATED ALKYLENE THIOALKANOIC ACIDS

[75] Inventors: Robert Bonner Hager, Collegeville; Gerald Joseph Walter, King of Prussia, both of Pa.

[73] Assignee: Pennwalt Corporation, Philadelphia, Pa.

[22] Filed: May 20, 1971

[21] Appl. No.: 145,556

[52] U.S. Cl. ............ 260/481 R, 106/271, 252/356, 252/389, 252/391, 260/486 R
[51] Int. Cl. .......................................... C07c 149/16
[58] Field of Search ............... 260/481 R, 490, 487, 260/484; 252/356

[56] References Cited
UNITED STATES PATENTS
3,172,910   3/1965   Brace ............................. 260/609 R
3,510,494   5/1970   Gagliardi ......................... 260/487
2,390,078   12/1945  De Groote ........................ 260/490

OTHER PUBLICATIONS
Schwartz et al., "Surface Active Agents and Detergents," Vol. II, Interscience Publ., Inc., N.Y., (1958), pages 108, 112-119.

Primary Examiner—Lorraine A. Weinberger
Assistant Examiner—John F. Terapane
Attorney—Stanley Litz

[57] ABSTRACT

Sulfur-containing, perfluoroalkyl amines and their quaternary salt and amine oxide derivatives having outstanding surfactant properties are provided having the structures and

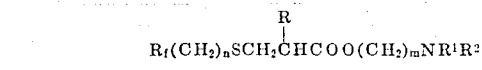

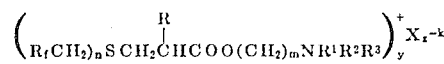

where $R_f$ is straight or branched-chain perfluoroalkyl, R is hydrogen or methyl, $R^1$ and $R^2$ are independently hydrogen or lower alkyl, n is an integer of 1 to 3, m is an integer of 2 to 4; X is an anion, y is an integer equal to k, the valence of X; z is 0 or 1, and when z is 1, then $R^3$ is hydrogen, lower alkyl or $CH_2COOH$; and when z is 0, then $R^3$ is oxygen, $CH_2COO^-$, $CH_2CH_2COO^-$ or $CH_2CH_2CH_2SO_3^-$.

7 Claims, No Drawings

ESTERS OF PERFLUOROALKYL TERMINATED ALKYLENE THIOALKANOIC ACIDS

This invention pertains to sulfur-containing, perfluoroalkyl amines and their quaternary salt and amine oxide derivatives. More particularly, this invention concerns a compound selected from the group consisting of I.
$$R_f(CH_2)_nSCH_2\overset{R}{\underset{|}{C}}HCOO(CH_2)_mNR^1R^{2z}$$

and

II.
$$\left(R_f(CH_2)_2SCH_2\overset{R}{\underset{|}{C}}HCOO(CH_2)_mNR^1R^2R^3\right)_y^+ X_{z-k}$$

(the II compound being a readily prepared derivative of the precursor I compound) where $R_f$ is a straight or branched-chain perfluoroalkyl group having from 5 to 13 carbon atoms; R is hydrogen or $CH_3$; $R^1$ and $R^2$ are independently hydrogen or alkyl having from 1 to 4 carbon atoms; n is an integer of 1 to 3; m is an integer of 2 to 4; X is an anion selected from the group consisting of Br, Cl, I, acetate, phosphate, and sulfate; y is an integer equal to k, the valence of X; and z is 0 or 1, provided that when z is 1, then $R^3$ is hydrogen, alkyl of 1 to 4 carbon atoms or $CH_2COOH$; and when z is 0, then $R^3$ is $CH_2COO^-$; $CH_2CH_2COO^-$; $CH_2CH_2CH_2SO_3^-$; or oxygen.

The precursor compound I is prepared by reacting the fluorinated mercaptan $R_f(CH_2)_nSH$ with an alkylaminoacrylate of the structure $$CH_2=\overset{R}{\underset{|}{C}}COO(CH_3)_mNR^1R^2$$

the substituents being defined above. The aminoalkyl acrylates are known compounds which are commercially available or readily prepared by standard organic synthesis techniques. The mercaptans, $R_f(CH_2)_nSH$, are known and are described, for example, in the patents to N. O. Brace, U.S. 3,172,910, Mar. 19, 1965 and to Hauptschein et al., U.S. Pat. No. 3,544,663, Dec. 1, 1970. Approximately stoichiometric amounts of the mercaptan and the aminoalkyl acrylate are reacted at from about 10° to 150°C., neat, or in a suitable solvent such as n-butanol, ethanol, 2-propanol, diethylene-glycol-monoethyl ether, or 2-ethoxy ethanol, to prepare the amine adduct I in high yield, e.g., about 75 to 100 percent, from which the solvent and any unreacted starting material is removed by a simple stripping operation.

The thus prepared amine adduct I is converted to the derivative compound II by techniques well known to the organic chemist. For instance, an amphoteric surfactant is prepared by reacting substantially stoichiometric amounts of the amine with such reactants as chloroacetic acid, sodium chloroacetate, potassium chloroacetate, propane sultone, propiolactone, and the like at temperatures within the range of about 10° to 150° C. Cationic surfactants are prepared in the conventional manner by reacting the amine compound I, neat, or in suitable solvent, such as n-butanol, ethanol or 2-propanol, at about 10° to 150° C., with typical quaternizing reactants exemplified by methyl iodide, ethyl iodide, and the like. The amine precursor of this invention is converted to its amine oxide derivative by treating the amine with aqueous hydrogen peroxide at about 0° to 50° C.

The following examples are presented to illustrate the preparation of the novel compounds of this invention and to demonstrate their valuable properties.

Example 1 — Reaction of $C_7F_{15}C_2H_4SH$ with Dimethylaminoethyl Methacrylate A flask fitted with a stirrer and reflux condenser is charged with 103 grams of isopropyl alcohol, 64.5 grams (0.15 mole) of $(CF_3)_2CF(CF_2)_4CH_2CH_2SH$ and 23.6 grams (0.15 mole) of dimethylaminoethyl methacrylate. Three drops of 10 percent NaOH is added and the mixture heated to reflux for 3 hours. The solvent is stripped off to yield the clear liquid product $(CF_3)_2CF(CF_2)_4C_2H_4SCH_2CH(CH_3)COOC_2H_4N(CH_3)_2$.

The structure is confirmed by infrared spectroscopy.

Example 2 — Reaction of Other Mercaptans with Aminoalkyl Acrylates

The procedure of Example 1 is followed in reacting various representative fluoroalkyl mercaptans of the structures:

$(CF_3)_2CF(CF_2)_2C_2H_4SH$ $(CF_3)_2CF(CF_2)_6C_2H_4SH$ $(CF_3)_2CF(CF_2)_8C_2H_4SH$ $CF_3(CF_2)_nC_2H_4SH$   n=1-11

$CF_3(CF_2)_nCH_2SH$ $(CF_3)_2CF(CF_2)_n(CH_2)_3SH$   n=2-10 with representative aminoalkyl acrylates of the structures $CH_2=C(CH_3)COOC_2H_4N(CH_3)_2$ $CH_2=CHCOOC_2H_4N(CH_3)_2$ $CH_2=C(CH_3)COOC_2H_4N(C_2H_5)_2$ $CH_2=C(CH_3)COOC_2H_4NH(t-C_4H_9)$ to produce the 1:1 amine adducts of this invention, i.e., the amine I of the formula $$R_f(CH_2)_nSCH_2\overset{R}{\underset{H}{C}}COO(CH_2)_mNR^1R^2$$

Example 3 — Preparation of Amphoteric Surfactants

Fifty grams (0.085 mole) of the amine prepared in Example 1 and 7.9 grams (0.084 mole) of chloroacetic acid are charged to an open resin flask fitted with a stirrer. The mixture is gradually heated to 100° C., then held at this temperature for 20 minutes. On cooling, the tough, taffy-like amphoteric surfactant $[(CF_3)_2CF(CF_2)_4CH_2CH_2SCH_2CH(CH_3)COOCH_2CH_2N(CH_3)_2CH_2COOH]^+Cl^-$ is recovered. In like manner, the amines produced in Example 2 are converted to the corresponding amphoteric compound derivatives. The chloride ion may be removed by treating the product with alcoholic base, for example NaOH in ethanol, KOH in isopropyl alcohol, or with a salt such as potassium acetate, which causes precipitation of the chloride as a salt.

Example 4 — Preparation of Cationic Surfactants

A reaction flask fitted with a stirrer is charged with 11.7 grams (0.02 mole) of the amine product from Example 1, 25 grams of isopropyl alcohol and 2.84 grams (0.02 mole) of methyl iodide. The mixture is stirred for 30 minutes, then filtered to isolate the white solid $(CF_3)_2CF(CF_2)_4C_2H_4SCH_2CH(CH_3)COOC_2H_4N^+(CH_3)_3I^-$ In like manner, the amines produced in Example 2 are converted to the corresponding cationic (quaternary salt) surfactants.

Example 5 — Preparation of Propane Sulfonic Acid Betaine Derivative

The amine adduct of Example 1 is dissolved in an equal weight of ethanol and an equimolar quantity of propane sultone is added. The mixture is allowed to stand at room temperature for 24 hours, and then evaporated to constant weight on a steam bath to yield the betaine product, $C_7F_{15}C_2H_4SCH_2CH(CH_3)COOC_2H_4N^+(CH_3)_2CH_2CH_2CH_2SO^-_3$

Example 6 — Preparation of Amine Oxides

A flask fitted with a magnetic stirrer is charged with 58.7 grams (0.1 mole) of the amine product prepared in Example 1 and 200 grams of water and 50 grams of isopropyl alcohol. Eight grams of 30 percent hydrogen peroxide is added and the mixture stirred at room temperature for six hours. Then an additional 7.0 g. of 30 percent hydrogen peroxide is added and the mixture stirred for an additional 18 hours. The solution becomes viscous and an additional 100 grams of water is added and stirring continued for six hours. The excess peroxide is decomposed with 5 percent Pd-on-charcoal and the mixture filtered to give a solution of the product

Example 7

Surface tension measurements of dilute aqueous solutions of representative compounds of the invention are set forth in the following Table I. Also shown is the surface tension data for the compound $C_8F_{17}SO_2NH(CH_2)_3N^+(CH_3)_2CH_2CH_2COO^-$, the only fluorine-containing amphoteric surfactant presently commercially available. It can be seen that the amphoterics of this invention, particularly the shorter chain compound, give lower surface tensions at lower concentrations, an important advantage with these very expensive materials.

TABLE 1

| Compound | Surface tension, dynes/cm. at 25° C. at concentration of percent— | | | | |
|---|---|---|---|---|---|
| | 1 | 0.1 | 0.01 | 0.001 | 0.0001 |
| $((CF_3)_2CF(CF_2)_4C_2H_4SCH_2CH(CH_3)COOC_2H_4N(CH_3)_2CH_2COOH)^+Cl^-$ | | 18 | 21 | 28 | 59 |
| $((CF_3)_2CF(CF_2)_6C_2H_4SCH_2CH(CH_3)COOC_2H_4N(CH_3)_2CH_2COOH)^+Cl^-$ | | 22 | 26 | 36 | |
| $(CF_3)_2CF(CF_2)_4C_2H_4SCH_2CH(CH_3)COOC_2H_4\overset{O}{\underset{\uparrow}{N}}(CH_3)_2$ | 18 | 19 | 20 | 25 | 71 |
| $(CF_3)_2CF(CF_2)_6C_2H_4SCH_2CH(CH_3)COOC_2H_4\overset{O}{\underset{\uparrow}{N}}(CH_3)_2$ | 21 | 24 | 25 | 39 | 61 |
| $(CF_3)_2CF(CF_2)_6C_2H_4SCH_2CH(CH_3)COOC_2H_4N^+(CH_3)_3I^-$ | | 19 | 20 | 39 | 71 |
| $C_8F_{17}SO_2NH(CH_2)_3N^+(CH_3)_2CH_2CH_2COO^-$ | | 19 | 27 | 40 | |

The compounds embodied in this invention are surface active agents giving a high degree of surface tension reduction at concentrations as low as 0.1 percent by weight and less. These new fluoroalkyl surfactants are of special value in the formulation of phosphoric-hydrochloric acid type cleaning solutions used on concrete and metals. In acidic baths for metal descaling, pickling, and etching, these compounds serve as both wetting agent and corrosion inhibitor. The new surfactants are also useful as corrosion inhibitors and leveling agents for aqueous wax and/or resin emulsions that are widely used in the form of the so-called "self-polishing" wax formulations which dry to a shine without buffing. Modern "heavy-duty" floor waxes are often formulated with resins that are insoluble in alkaline cleaning compositions, e.g., soaps and detergents, even though the resins are easily solubilized by acidic cleaners. The cationic, alkaline-insoluble, fluoroalkyl surfactants of this invention are ideally suited for such formulations, improving the leveling, gloss, and wetting power while minimizing streaking. For instance, a standard self-polishing floor wax formulation is as follows:

| Component | Parts by weight |
|---|---|
| Aqueous dispersion containing 30% by weight of polyethylene resin particles having melting point 213°–221°F. | 222 |
| Aqueous dispersion containing 15% by weight of acrylic resin ("Rhoplex B-83") | 1150 |
| Diethylene glycol monoethyl ether, $CH_2OHCH_2OCH_2CH_2OC_2H_5$ | 60 |
| Nonyl phenol-ethylene oxide condensation product, 9–10 mols ethylene oxide/mol of phenol | 12 |
| Tri(2-ethylhexyl)phosphate | 14 |
| Distilled water | 1968 |

Such a formulation does not dry to a satisfactory gloss on floor tiles, but the incorporation of 0.3 percent or less of a surfactant compound embodied herein does provide a uniform, glossy film therefrom.

A preferred embodiment of the invention is the compound having amphoteric surfactant properties, particularly the compounds, $(R_f(CH_2)_2SCH_2CH(CH_3)COO(CH_2)_2N(CH_3)_2CH_2COOH)^+Cl^-$ and $R_f(CH_2)_2SCH_2CH(CH_3)COO(CH_2)_2N^+(CH_3)_2CH_2COO^-$, which are especially useful in aqueous fire-fighting foam compositions.

We claim:

1. A compound selected from the group consisting of

I.

and

II.
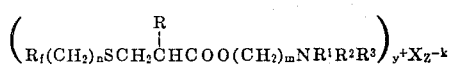

where $R_f$ is a straight or branched perfluoroalkyl group having from 5 to 13 carbon atoms; R is hydrogen or $CH_3$; $R^1$ and $R^2$ are independently hydrogen or alkyl having from 1 to 4 carbon atoms; n is an integer of 1 to 3; m is an integer of 2 to 4; X is an anion selected from the group consisting of Br, Cl, I, acetate, phosphate, and sulfate; y is an integer equal to k, the valence of X; and z is 0 or 1, provided that when z is 1, then $R^3$ is hydrogen, alkyl of 1 to 4 carbon atoms or $CH_2COOH$; and when z is 0, then $R^3$ is $CH_2COO^-$; $CH_2CH_2COO^-$; $CH_2CH_2CH_2SO_3^-$; or oxygen.

2. A compound according to claim 1 wherein n is 2.
3. A compound according to claim 1 wherein $R^1$ and $R^2$ are each methyl, m is 2, and R is $CH_3$.
4. A compound according to claim 3 where n is 2.
5. The compound having the formula $(R_f(CH_2)_2SCH_2CH(CH_3)COO(CH_2)_2N(CH_3)_2CH_2COOH)^+Cl^-$ where $R_f$ is a straight or branched perfluoroalkyl group having from 5 to 13 carbon atoms.

6. A compound according to claim 5 where $R_f$ is $(CF_3)_2CF(CF_2)_4$

7. A compound according to claim 5 where $R_f$ is $(CF_3)_2CF(CF_2)_6$

* * * * *